(12) United States Patent
Zhou et al.

(10) Patent No.: US 11,291,006 B2
(45) Date of Patent: Mar. 29, 2022

(54) TECHNIQUES FOR CONFIGURING ACTIVE SPATIAL RELATIONS IN WIRELESS COMMUNICATIONS

(71) Applicant: QUALCOMM Incorporated, San Diego, CA (US)

(72) Inventors: Yan Zhou, San Diego, CA (US); Makesh Pravin John Wilson, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 16/561,999

(22) Filed: Sep. 5, 2019

(65) Prior Publication Data

US 2020/0120656 A1 Apr. 16, 2020

Related U.S. Application Data

(60) Provisional application No. 62/744,188, filed on Oct. 11, 2018.

(51) Int. Cl.
| | | |
|---|---|---|
| *H04W 72/04* | (2009.01) | |
| *H04L 1/00* | (2006.01) | |
| *H04L 5/00* | (2006.01) | |
| *H04W 8/08* | (2009.01) | |
| *H04W 80/02* | (2009.01) | |

(52) U.S. Cl.
CPC ......... *H04W 72/046* (2013.01); *H04L 1/0026* (2013.01); *H04L 5/0051* (2013.01); *H04W 8/08* (2013.01); *H04W 72/0493* (2013.01); *H04W 80/02* (2013.01)

(58) Field of Classification Search
None
See application file for complete search history.

(56) References Cited

U.S. PATENT DOCUMENTS

| | | | | |
|---|---|---|---|---|
| 10,498,511 B2 * | 12/2019 | Qin | ....................... | H04L 5/0048 |
| 10,764,896 B2 * | 9/2020 | Guo | ...................... | H04L 5/0053 |
| 10,863,494 B2 * | 12/2020 | Zhang | ..................... | H04L 5/005 |
| 11,051,310 B2 * | 6/2021 | Zhou | ..................... | H04L 5/0094 |

(Continued)

FOREIGN PATENT DOCUMENTS

| | | |
|---|---|---|
| CA | 3042828 A1 | 5/2018 |
| WO | 2018000430 A1 | 1/2018 |

OTHER PUBLICATIONS

International Search Report and Written Opinion—PCT/US2019/050024—ISA/EPO—dated Nov. 8, 2019.

(Continued)

*Primary Examiner* — Tri H Phan
(74) *Attorney, Agent, or Firm* — Qualcomm Incorporated

(57) ABSTRACT

Aspects described herein relate to configuring active spatial relations in wireless communications. A capability indicating a number of active spatial relations supported for detecting downlink reference signals or generating uplink beams can be indicated to an access point. A configuration of spatial relations indicating a transmit filter of reference signals for use in transmitting uplink communications can be received from the access point and based on the capability. One or more of the reference signals received from the access point can be detected based on the configuration.

64 Claims, 6 Drawing Sheets

(56) References Cited

U.S. PATENT DOCUMENTS

| | | | |
|---|---|---|---|
| 11,115,970 B2* | 9/2021 | Zhou | H04W 72/042 |
| 2018/0199258 A1 | 7/2018 | Cezanne et al. | |
| 2018/0219606 A1 | 8/2018 | Ng et al. | |
| 2019/0349122 A1 | 11/2019 | Nam et al. | |
| 2020/0053717 A1* | 2/2020 | Zhou | H04B 7/0695 |
| 2020/0107341 A1* | 4/2020 | Zhang | H04W 72/042 |
| 2020/0120644 A1 | 4/2020 | Zhou et al. | |
| 2021/0136768 A1* | 5/2021 | Kang | H04W 72/0466 |
| 2021/0144716 A1* | 5/2021 | Choi | H04W 76/27 |

OTHER PUBLICATIONS

Qualcomm Incorporated: "Beam Management for NR", 3GPP draft; R1-1811633, 3rd Generation Partnership Project (3GPP), Mobile Competence Centre; 650, Route Des Lucioles; F-06921, Sophia-Antipolis Cedex; France, vol. RAN WG1, No. Chengdu, China, Sep. 30, 2018 (Sep. 30, 2018), 13 pages, XP051519027, Retrieved from the Internet: URL:http://www.3gpp.org/ftp/tsg%5Fran/WG1%5FRL1/TSGR1%5F94b/Docs/R1%2D1811633%2Ezip.

"R1-1809486—Intel—UE features—Table," 3GPP Draft, R1-1809486—Intel—UE Features—Table, 3rd Generation Partnership Project (3GPP), Mobile Competence Centre, 650, Route Des Lucioles, F-06921, Sophia-Antipolis Cedex, France, Aug. 17, 2018 (Aug. 17, 2018), XP051516849, 35 pages, Retrieved from the Internet: URL: http://www.3gpp.org/ftp/tsg%5Fran/WG1%5FRL1/TSGR1%5F94/Docs/R1%2D1809486%2Ezip [retrieved on Aug. 17, 2018] p. 1-p. 23.

ZTE: "Maintenance for Beam Management," 3GPP Draft, 3GPP TSG RAN WG1 Meeting #94bis, R1-1810214, Maintenance for Beam Management, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051517630,11 pages, Retrieved from the Internet: URL: http://www.3gpp.org/ftp/tsg%5Fran/WG1%5FRL1/TSGR1%5F94b/Docs/R1%2D1810214%2Ezip [retrieved on Sep. 29, 2018].

\* cited by examiner

US 11,291,006 B2

TECHNIQUES FOR CONFIGURING ACTIVE SPATIAL RELATIONS IN WIRELESS COMMUNICATIONS

CLAIM OF PRIORITY UNDER 35 U.S.C. § 119

The present Application for Patent claims priority to Provisional Application No. 62/744,188, entitled "TECHNIQUES FOR CONFIGURING ACTIVE SPATIAL RELATIONS IN WIRELESS COMMUNICATIONS" filed Oct. 11, 2018, which is assigned to the assignee hereof and hereby expressly incorporated by reference herein for all purposes.

BACKGROUND

Aspects of the present disclosure relate generally to wireless communication systems, and more particularly, to configuring active spatial relations.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In addition, 5G NR supports the use of millimeter wave (mmW) antenna systems where nodes of the network (e.g., gNodeBs, user equipment (UEs), etc.) can include arrays of antennas and/or multiple subarrays of antennas in multiple radio frequency integrated circuits (RFICs) or other modules. The nodes can beamform signal energy (e.g., for transmitting or receiving signals) towards other nodes to facilitate communicating therebetween. Beamforming in this regard can include, for example, applying energy or power to certain ones of the arrays, subarrays, and/or antennas within an array or subarray such that some antennas have more energy than others and can thus form a beam in one or more directions for transmitting and/or receiving signals.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes indicating, to an access point, a capability indicating a number of active spatial relations supported for detecting downlink reference signals or generating uplink beams, receiving, from the access point and based on the capability, one or more configurations of spatial relations indicating a transmit filter of reference signals for use in transmitting uplink communications, and detecting, based on the one or more configurations, one or more of the reference signals received from the access point.

In another example, a method for wireless communication is provided. The method includes receiving, from a user equipment (UE), a capability indicating a number of active spatial relations supported for detecting downlink reference signals or generating uplink beams, generating, based on the capability, one or more configurations of spatial relations indicating a transmit filter of reference signals for use in transmitting uplink communications, and transmitting the one or more configurations to the UE.

In another example, an apparatus for wireless communication is provided that includes a transceiver, a memory configured to store instructions, and one or more processors communicatively coupled with the transceiver and the memory. The one or more processors are configured to indicate, to an access point, a capability indicating a number of active spatial relations supported for detecting downlink reference signals or generating uplink beams, receive, from the access point and based on the capability, one or more configurations of spatial relations indicating a transmit filter of reference signals for use in transmitting uplink communications, and detect, based on the one or more configurations, one or more of the reference signals received from the access point.

In another example, an apparatus for wireless communication is provided that includes a transceiver, a memory configured to store instructions, and one or more processors communicatively coupled with the transceiver and the memory. The one or more processors are configured to receive, from a UE, a capability indicating a number of active spatial relations supported for detecting downlink reference signals or generating uplink beams, generate, based on the capability, one or more configurations of spatial relations indicating a transmit filter of reference signals for use in transmitting uplink communications, and transmit the one or more configurations to the UE.

In another example, an apparatus for wireless communication is provided that includes means for indicating, to an access point, a capability indicating a number of active spatial relations supported for detecting downlink reference signals or generating uplink beams, means for receiving, from the access point and based on the capability, one or more configurations of spatial relations indicating a transmit filter of reference signals for use in transmitting uplink communications, and means for detecting, based on the one or more configurations, one or more of the reference signals received from the access point.

In another example, an apparatus for wireless communication is provided that includes means for receiving, from a UE, a capability indicating a number of active spatial relations supported for detecting downlink reference signals or generating uplink beams, means for generating, based on the capability, one or more configurations of spatial relations indicating a transmit filter of reference signals for use in transmitting uplink communications, and means for transmitting the one or more configurations to the UE.

In another example, a computer-readable medium including code executable by one or more processors for wireless communication is provided. The code includes code for indicating, to an access point, a capability indicating a number of active spatial relations supported for detecting downlink reference signals or generating uplink beams, receiving, from the access point and based on the capability, one or more configurations of spatial relations indicating a transmit filter of reference signals for use in transmitting uplink communications, and detecting, based on the one or more configurations, one or more of the reference signals received from the access point.

In another example, a computer-readable medium including code executable by one or more processors for wireless communication is provided. The code includes code for receiving, from a UE, a capability indicating a number of active spatial relations supported for detecting downlink reference signals or generating uplink beams, generating, based on the capability, one or more configurations of spatial relations indicating a transmit filter of reference signals for use in transmitting uplink communications, and transmitting the one or more configurations to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
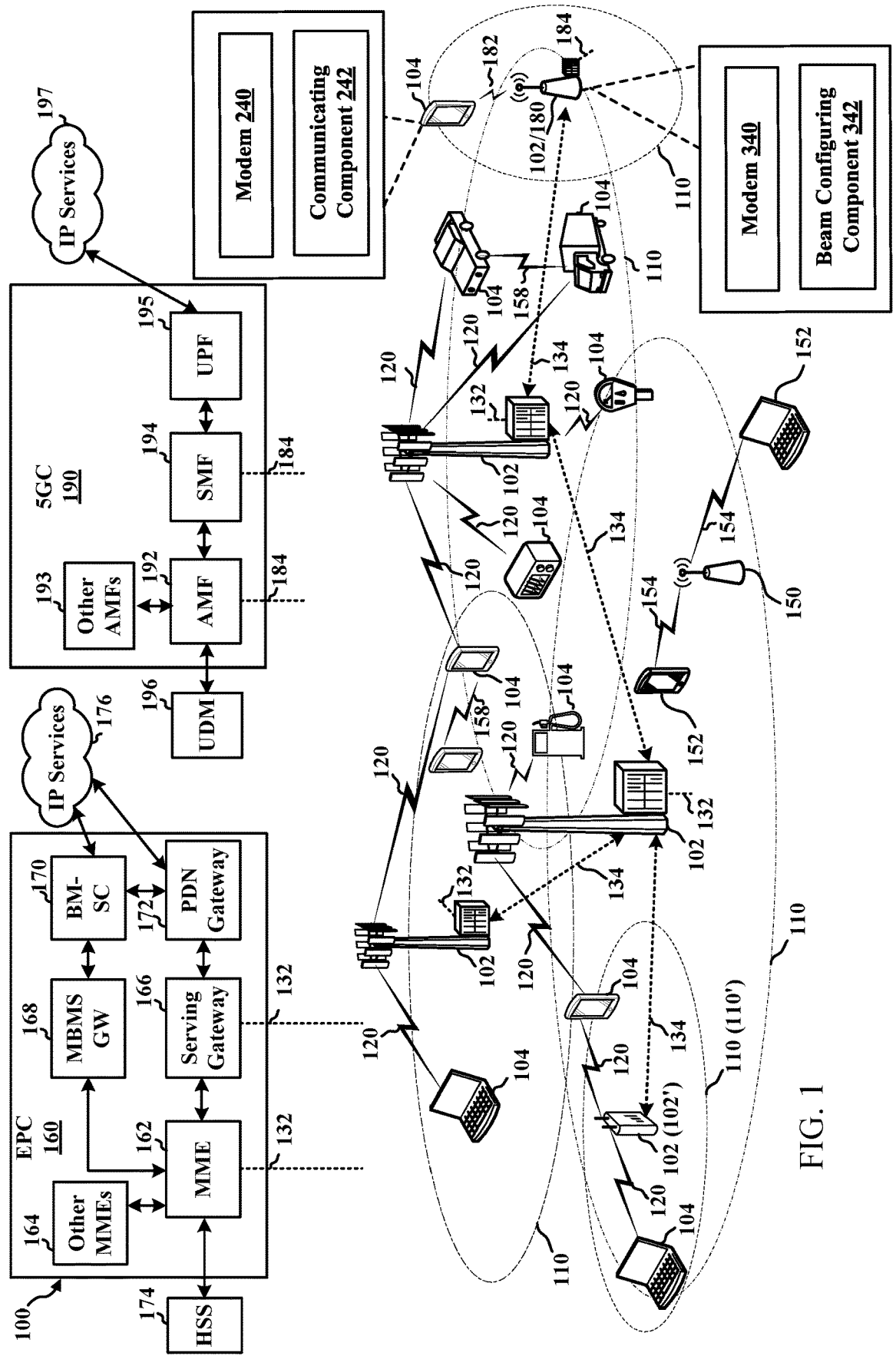
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring active spatial relations in wireless communications. For example, the active spatial relations can correspond to detectable reference signals and/or useable beams for communications, which may be based on the reference signals, as described herein. The active spatial relations, for example, can be configured by a first node (e.g., an access point) for transmitting to a second node (e.g., a UE). In one example, the first node may initially configure a number of configured spatial relations and then can configure a number of active spatial relations as a subset of the configured spatial relations. For example, the configured spatial relations may define relationships with corresponding configured transmission configuration indicator (TCI) states. For example, the TCI states can be configured for receiving downlink communications, and the configured spatial relations can be configured for transmitting uplink communications using corresponding beams. In one specific example, a given configured spatial relationship can correspond to the same beam information (e.g., quasi-colocation (QCL) type) as a configured TCI state at a similar index in a configuration.

In an example, the second node can indicate (e.g., to the first node) a capability for detecting active spatial relations, where the active spatial relations can be in the form of at least one of reference signals received from the first node or beams that can be used in transmitting communications to the first node or receiving communications from the first node. For example, where the first node is an access point and the second node is a UE, the UE can indicate a capability of a number of active spatial relations to the access point, which can correspond to a number (e.g., a maximum number) of reference signals the UE is capable of detecting and/or a number of beams the UE is capable of considering for transmitting uplink communications to, or receiving downlink communications from, the access point.

In this example, the access point can determine, based on the indicated capability, a configuration of active spatial relations (e.g., as a subset of configured spatial relations) for the UE. For example, the configuration can indicate one or more of downlink reference signals (DL RS) that may not include aperiodic channel state information reference signals (A-CSI-RS), one or more sounding reference signals (SRS) not already indicated as part of the one or more DL RS, one or more distinct transmission configuration indicator (TCI) states of one or more aperiodic channel state information reference signals, and/or the like. The UE can accordingly receive the configuration from the access point, and can use the active spatial relations in communicating with the access point. For example, the UE can determine or detect one or more reference signals transmitted by the access point as one or more reference signals indicated by the configuration. In another example, the UE can determine one or more beams to use in beamforming communications to the access point based on one or more reference signal indicated by the configuration and/or based on the one or more reference signals received from the access point. For example, this can include detecting the one or more reference signals and beamforming uplink communications based on reciprocity using a beamforming indicated by, or otherwise related to, the one or more reference signals. In this regard, the UE can limit the number of possible active spatial relations configured by the access point, which can allow the UE to more efficiently use the active spatial relations based on its capabilities.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for receiving a configuration of active spatial relations, and some nodes may have a modem 340 and RS configuring component 342 for generating and/or transmitting a configuration of spatial relations, as described herein. Though a UE 104 is shown as having the modem 240 and communicating component 242 and a base station 102/gNB 180 is shown as having the modem 340 and RS configuring component 342, this is one illustrative example, and substantially any node or type of node may include a modem 240 and communicating component 242 and/or a modem 340 and RS configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can indicate one or more capabilities of the UE 104 regarding active spatial relations, and can receive an associated configuration of active spatial relations for detecting downlink reference signals and/or beamforming uplink signals. In addition, RS configuring component 342 can receive the capability indicated by the UE 104 and can accordingly generate and transmit a configuration of active spatial relations related to downlink reference signals to be transmitted to the UE 104.

Figure 2:
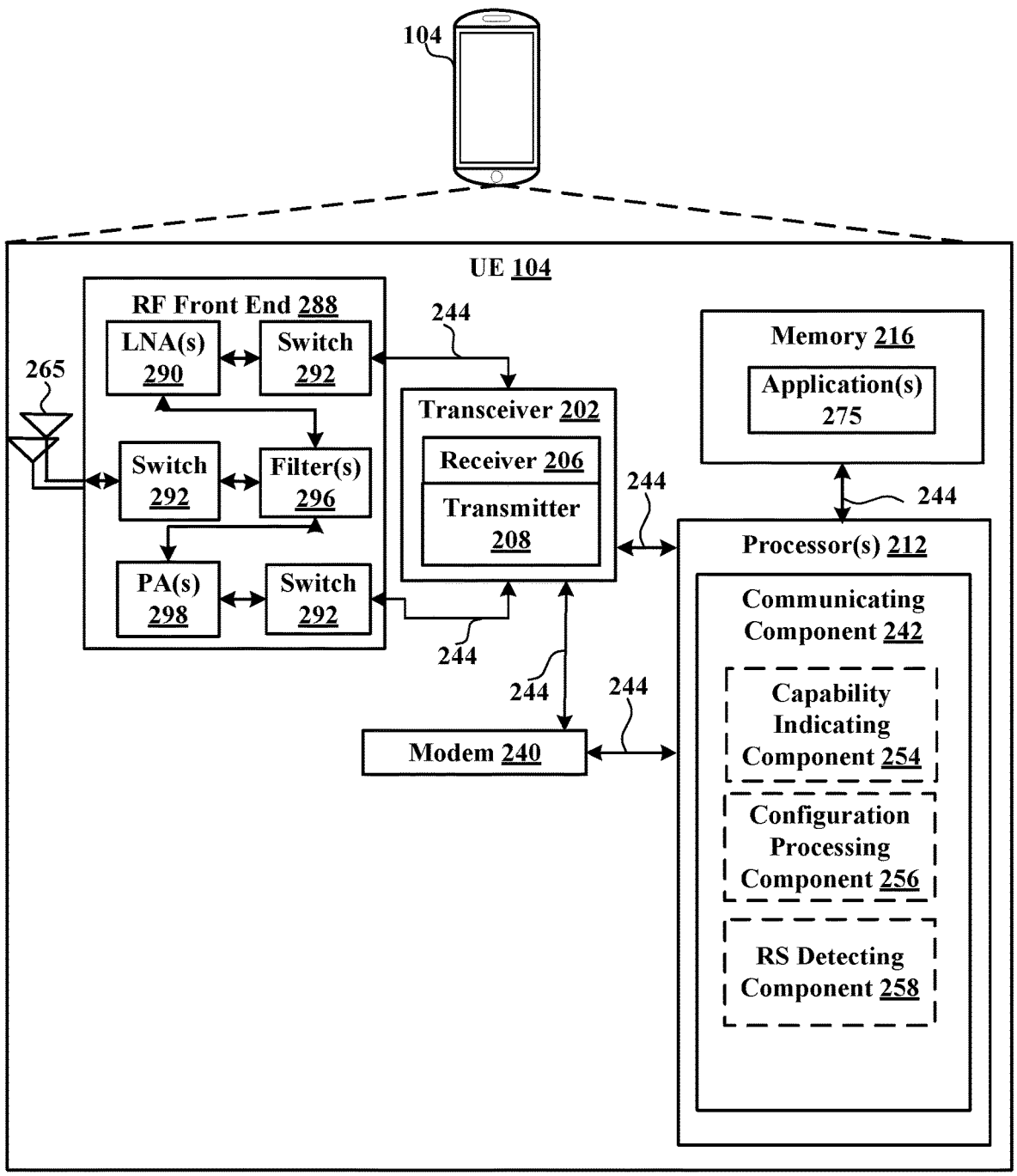
FIG. 2 is a block diagram illustrating an example of a UE, in accordance with various aspects of the present disclosure.
Figure 3:
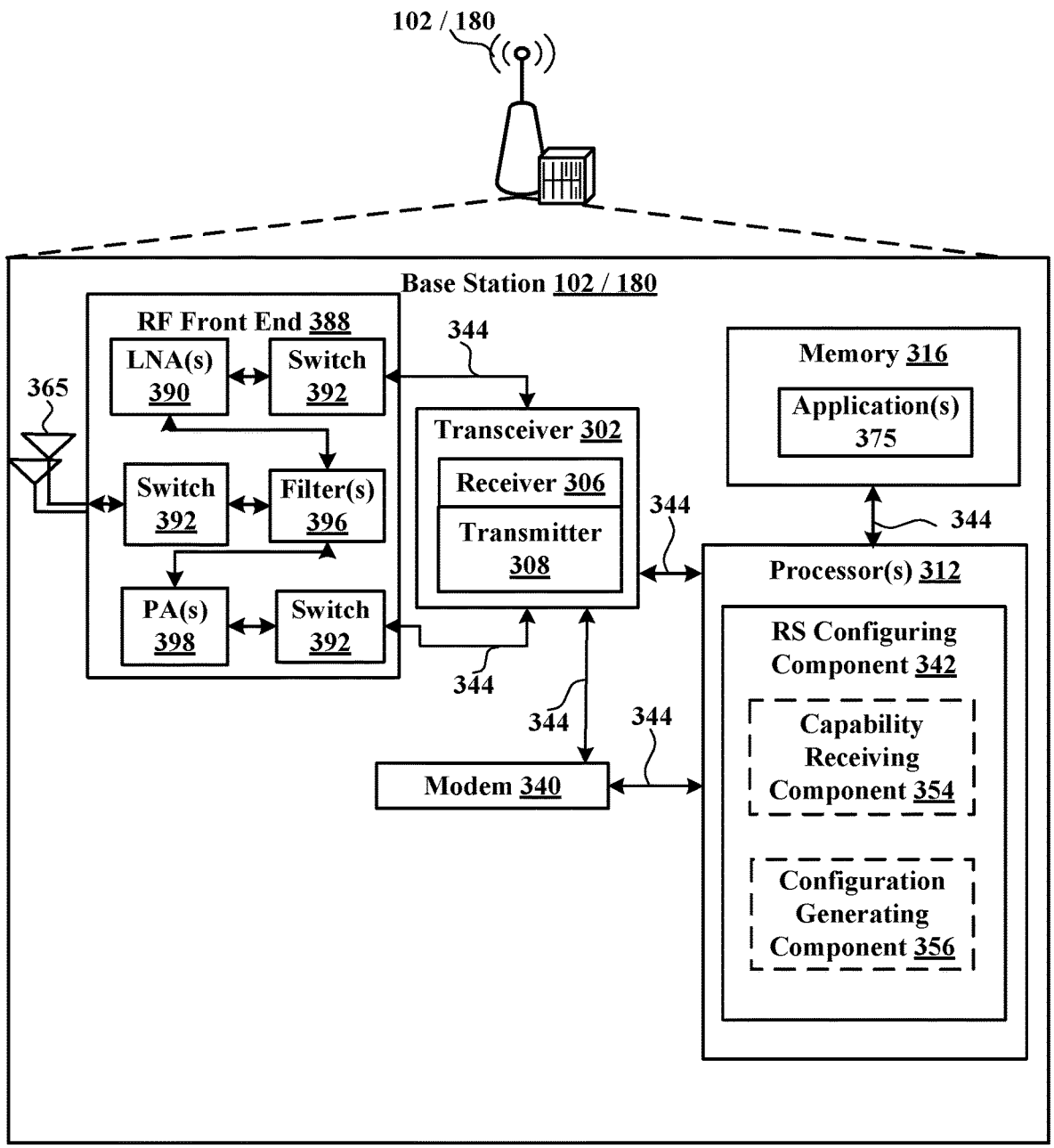
FIG. 3 is a block diagram illustrating an example of a base station, in accordance with various aspects of the present disclosure.
Figure 4:
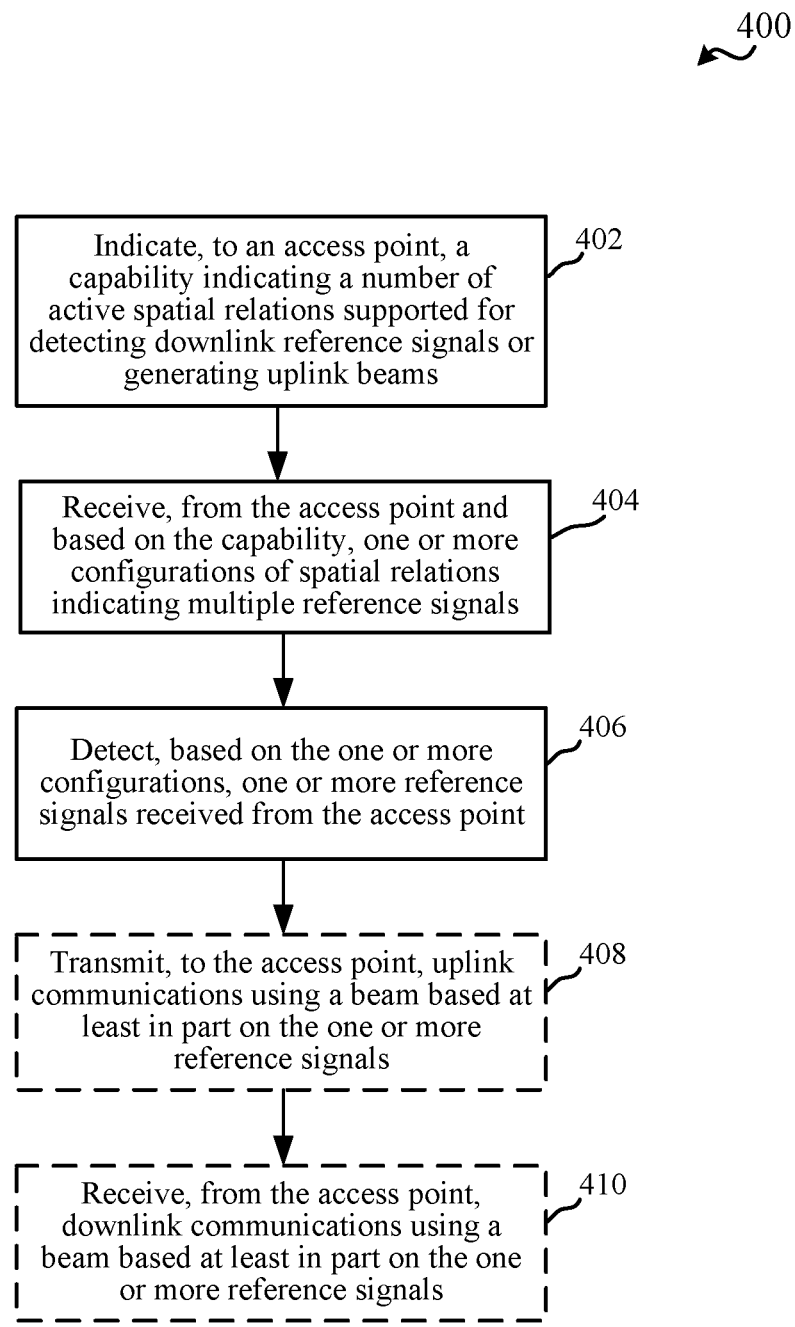
FIG. 4 is a flow chart illustrating an example of a method for receiving a configuration of active spatial relations, in accordance with various aspects of the present disclosure.
Figure 5:
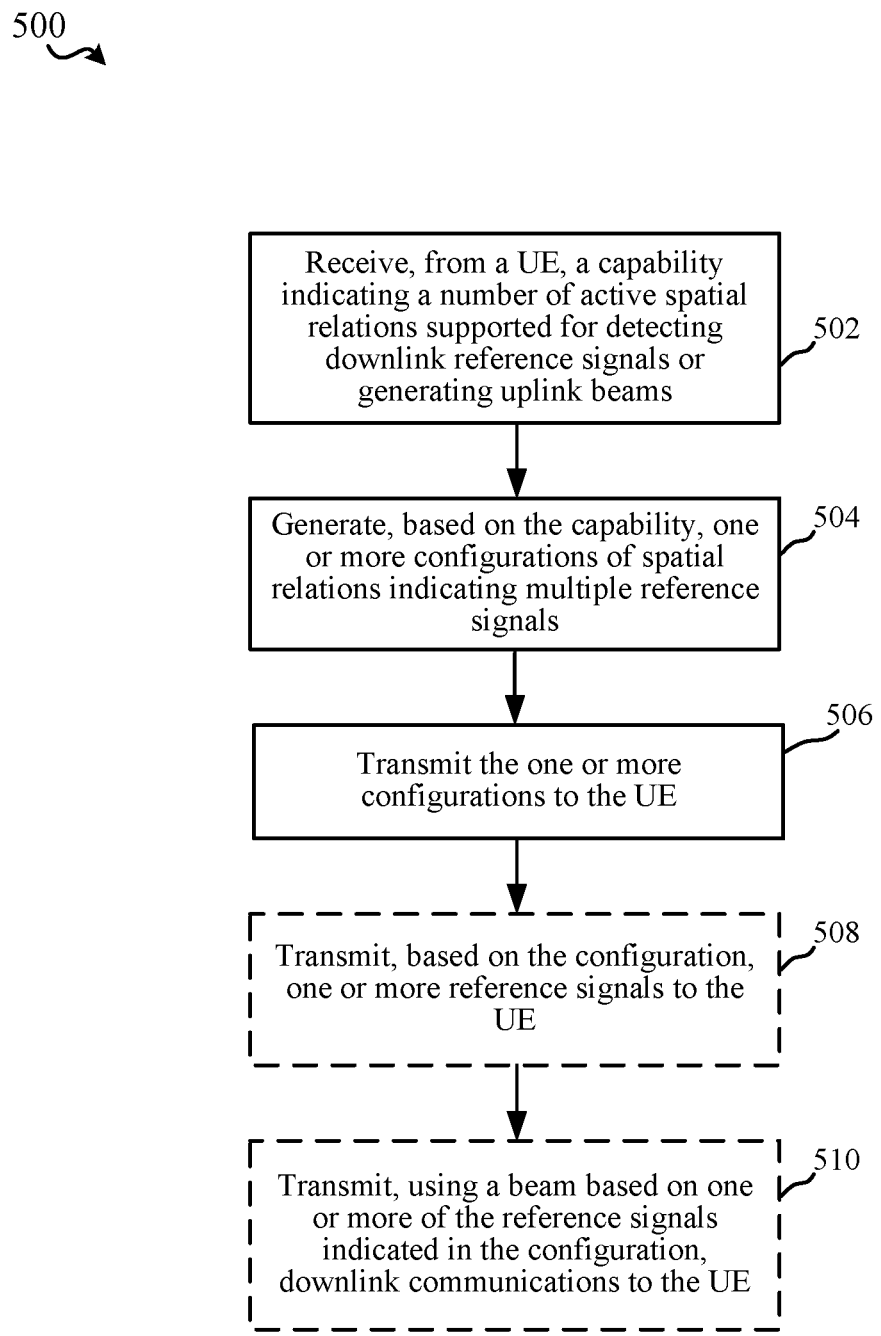
FIG. 5 is a flow chart illustrating an example of a method for generating a configuration of active spatial relations, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 to enable one or more of the functions described herein related to receiving a configuration of active spatial relations.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a capability indicating component 254 for indicating a capability for active spatial relations of the UE 104, a configuration processing component 256 for receiving and processing a configuration transmitted by an access point based on the indicated capability, where the configuration can indicate multiple active spatial relations, and/or a RS detecting component 258 for detecting one or more DL reference signals transmitted based on the configuration.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102/180 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and RS configuring component 342 for configuring multiple spatial relations for communicating with a UE 104.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, RS configuring component 342 can optionally include a capability receiving component 354 for receiving an indication of a capability of a UE 104 with respect to active spatial relations, and/or a configuration generating component 356 for generating a configuration of active spatial relations as multiple reference signals based on the capability.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for receiving and utilizing a configuration of active spatial relations. In an example, a UE 104 can perform the functions described in method 400 using one or more of the components described in FIGS. 1-2.

In method 400, at Block 402, a capability indicating a number of active spatial relations supported for detecting downlink reference signals or generating uplink beams can be indicated to an access point. In an aspect, capability indicating component 254, e.g., in conjunction with processor(s) 212, memory 216, transceiver 202, communicating component 242, etc., can indicate, to the access point (e.g., base station 102/180), the capability indicating the number of active spatial relations supported for detecting downlink reference signals or generating uplink beams. For example, capability indicating component 254 can indicate the capability as part of initiating a connection with the access point (e.g., as part of a random access channel (RACH) procedure, as part of higher layer signaling, such as RRC signaling, and/or the like), and can indicate the number as an integer number (e.g., 4, 8, etc.) of active spatial relations the UE 104 can support (e.g., a maximum number of active spatial relations). Additionally, the number of active spatial relations can relate to the number supported by the UE 104 in detecting downlink reference signals received from the access point, in generating uplink beams for transmission to the access point (e.g., based on reciprocity of received downlink reference signals), which may include beams for beamforming physical uplink control channel (PUCCH) and/or physical uplink shared channel (PUSCH) communications, etc., in detecting downlink beams for receiving downlink communications from the access point, which may include physical downlink control channel (PDCCH) and/or physical downlink shared channel (PDSCH) communications, etc., and/or the like.

In method 400, at Block 404, one or more configurations of spatial relations indicating multiple reference signals can be received from the access point. In an aspect, configuration processing component 256, e.g., in conjunction with processor(s) 212, memory 216, transceiver 202, communicating component 242, etc., can receive, from the access point (e.g., base station 102/180) and based on the capability, the one or more configurations of spatial relations indicating the multiple reference signals. For example, based on the number of active spatial relations indicated by the UE 104, the access point can generate the configuration of active spatial relations as one or more of multiple types of reference signals that match the supported number. For example, the number of active spatial relations may be specified as a subset of a configured number of active spatial relations or a configured number of TCI states, as described above. As described further herein, for example, the access point can configure the active spatial relations such that each distinct DL RS that is not an A-CSI-RS (e.g., not an aperiodic non-zero-power (NZP) RS) can represent one active spatial relation, each distinct SRS that is not already configured with each distinct DL RS can represent one active spatial relation, and each distinct state TCI of a A-CSI-RS (e.g., an aperiodic NZP RS) can represent one active spatial relation. In this regard, a count of the one or more distinct TCI states of one or more A-CSI-RSs, and/or the count of one or more distinct TCI states of one or more A-CSI-RSs added to a second count of other reference signals in the one or more configurations, can be less than or equal to the number of active spatial relations indicated in the capability.

With respect to the distinct TCI state of A-CSI-RS, for example, a given A-CSI-RS resource can be configured with up to 64 trigger states each having a given TCI state. In one example, configuration processing component 256 can initially receive a configuration of configured TCI states, from which a number of active TCI states can be indicated. For example, the initial configuration may be received in radio resource control (RRC) layer signaling. In an example, each distinct TCI state of a A-CSI-RS that is configured or further down selected by MAC-CE in a configuration can represent one active spatial relation. In addition, a distinct TCI state can be identified as a TCI state for a given trigger state of a given configured A-CSI-RS that has at least one of a distinct TCI identifier or a distinct QCL Type-D (e.g., where the QCL Type-D can be indicated as a QCL type for the RS).

Thus, for example, a maximum number of active spatial relations can include unique DL RS (except for aperiodic NZP CSI-RS), SRS without spatial relation configured, and distinct TCI states available for downlink control information (DCI) triggering of aperiodic NZP CSI-RS. The active spatial relations can be used for indicating spatial domain transmit filter for PUCCH and PUSCH, per bandwidth part (BWP) per component carrier (CC). Accordingly, the configuration can indicate the configuration of active spatial relations as reference signals for each of multiple CCs and each BWP within the CC(s).

In any case, in one example, configuration processing component 256 can receive the configuration in RRC (as the configured spatial relations or TCI states) or other higher layer signaling from the access point, in a MAC-CE that down selects a number of active spatial relations from the configured spatial relations or TCI states, etc. The signaling can include various information elements that indicate the active spatial relations in the multiple types of reference signals. Configuration processing component 256 can process the configuration and use the configuration for detecting and processing reference signals as received from the access point, as described further herein. For example, configuration processing component 256 can determine, based on the configuration, the active spatial relations and/or corresponding resources on which the active spatial relations can be transmitted.

In method 400, at Block 406, one or more reference signals received from the access point can be detected based on the one or more configurations. In an aspect, RS detecting component 258, e.g., in conjunction with processor(s) 212, memory 216, transceiver 202, communicating component 242, etc., can detect, based on the one or more configurations, the one or more reference signals received from the access point. For example, the configuration(s) may indicate certain parameters of the reference signals, which the UE 104 can use in attempting to detect the reference signals as received from the access point.

For example, as described, the configuration(s) can include or can otherwise indicate one or more of distinct DL RSs that are not A-CSI-RSs, SRSs that are not configured with the DL RSs, or TCI states of A-CSI-RSs which can each be considered as one active spatial relation. In one example, the configuration can specify an array of spatial relations for the DL RSs indicating a reference signal index, which may be one of a synchronization signal (SS) block index, a CSI-RS index, or SRS information (which may include an SRS resource and a bandwidth part). The configuration can separately specify an array of spatial relations for SRSs that are not included in the DL RSs, which may include similar parameters. In this regard, RS detecting component 258 may determine resources related to the reference signals based on the reference signal index, the SRS information, etc. For either array, RS detecting component 258 may also identify the A-CSI-RSs based on determining CSI-RS information using the CSI-RS index, where the CSI-RS information can further indicate whether the CSI-RS is aperiodic and/or TCI state(s) and related information (e.g., TCI identifier, QCL type, etc.) associated with the CSI-RS. RS detecting component 258 can detect the DL RS(s), SRS(s), and/or A-CSI-RS(s) (and/or corresponding trigger state(s), TCI state(s), etc.) transmitted by the access point.

Additionally, as described, configuration generating component 356 can generate a configuration of active spatial relations for each of multiple BWPs of each of multiple CCs.

In method 400, optionally at Block 408, uplink communications can be transmitted to the access point using a beam based at least in part on the one or more reference signals. In an aspect, communicating component 242, e.g., in conjunction with processor(s) 212, memory 216, transceiver 202, etc., can transmit, to the access point (e.g., base station 102/180), the uplink communications (e.g., PUCCH/PUSCH communications) using the beam based at least in part on the one or more reference signals indicated by the active spatial relations. For example, the communicating component 242 can determine the beam using reciprocity based on one or more of the detected reference signals. The communicating component 242, in this regard, may determine one of the one or more reference signals having desirable signal properties (e.g., a signal metric, such as a reference signal received power (RSRP), reference signal received quality (RSRQ), received signal strength indicator (RSSI), signal-to-noise ratio (SNR), signal-to-interference-and-noise ratio (SINR), etc., achieving a threshold or being highest among signal metrics of other reference signals, etc.). The communicating component 242 can determine a beam associated with this reference signal, and can use the beam in determining reciprocal beam properties for generating the beam for uplink communications back to the access point. In another example, communicating component 242 may receive downlink control information (DCI) from the access point that may schedule the uplink communications, where the DCI can indicate or trigger a TCI state (e.g., a TCI state or corresponding trigger state of a A-CSI-RS or otherwise), and can determine the active spatial relation that corresponds to the TCI state.

In method 400, optionally at Block 410, downlink communications can be received from the access point using a beam based at least in part on the one or more reference signals. In an aspect, communicating component 242, e.g., in conjunction with processor(s) 212, memory 216, transceiver 202, etc., can receive, from the access point (e.g., base station 102/180), the downlink communications (e.g., PDCCH/PDSCH communications) using the beam based at least in part on the one or more reference signals. In one example, as described, the downlink communications (e.g., PDCCH) may include a DCI that indicates a TCI state to which the reference signal(s) relate.

FIG. 5 illustrates a flow chart of an example of a method 500 for generating a configuration of active spatial relations. In an example, a base station 102/180 can perform the functions described in method 500 using one or more of the components described in FIGS. 1 and 3.

In method 500, at Block 502, a capability indicating a number of active spatial relations supported for detecting downlink reference signals or generating uplink beams can be received from a UE. In an aspect, capability receiving component 354, e.g., in conjunction with processor(s) 312, memory 316, transceiver 302, RS configuring component 342, etc., can receive, from the UE (e.g., UE 104), the capability indicating the number of active spatial relations supported for detecting downlink reference signals or generating uplink beams. As described, the capability may be include in signaling from the UE 104 when establishing a connection with the access point (e.g., as part of a RACH procedure) and may indicate an integer number of supported active spatial relations. In another example, the capability can correspond to a value from which the number of supported active spatial relations can be determined, such as a UE class, radio type or version/software version, etc. In any case, RS configuring component 342 can determine the number of active spatial relations the UE 104 can support.

In method 500, at Block 504, one or more configurations of spatial relations indicating multiple reference signals can be generated based on the capability. In an aspect, configuration generating component 356, e.g., in conjunction with processor(s) 312, memory 316, transceiver 302, RS configuring component 342, etc., can generate, based on the capability, the one or more configurations of spatial relations indicating the multiple reference signals. For example, RS configuring component 342 can configure the spatial relations as certain reference signals transmitted by the base station 102/180. For example, RS configuring component 342 may select the reference signals to configure to comply with the number indicated by the capability. In one example, configuration generating component 356 can generate an initial configuration of configured spatial relations or TCI states, and can then generate the one or more configurations that down select a number of active spatial relations from the configured spatial relations or TCI states. As described, for example, each distinct DL RS that is not an A-CSI-RS can represent one active spatial relation, each distinct SRS that is not already configured with each distinct DL RS can represent one active spatial relation, and each distinct TCI state of a A-CSI-RS can represent one active spatial relation. Thus, for example, the configuration generating component 356 can generate the one or more configurations with a combination of such reference signals until the number indicated by the capability is achieved.

Moreover, for example, configuration generating component 356 can configure one or more arrays of reference signals for the UE 104 (e.g., in a separate configuration that indicates the RS information for obtaining the RS from the access point). In this example, configuration generating component 356 can configure the active spatial relations as a subset of the configured reference signals (e.g., as a subset of the configured DL RSs, SRSs not indicated in the DL RSs, A-CSI-RSs, etc., as described). The configuration generating component 356 can separately indicate the configuration of active spatial relations using identifiers of associated reference signals that are configured in the separate RS configuration. In one example, configuration generating component 356 can generate the configuration as separate arrays of active spatial relations (e.g., one array for one or more DL RSs, one array for one or more SRSs that are not indicated in the array of one or more DL RSs, one array for A-CSI-RSs, etc.).

In method 500, at Block 506, the one or more configurations can be transmitted to the UE. In an aspect, RS configuring component 342, e.g., in conjunction with processor(s) 312, memory 316, transceiver 302, etc., can transmit the one or more configurations to the UE (e.g., UE 104). For example, RS configuring component 342 can transmit the initial configuration of configured spatial relations or TCI states to the UE 104 in RRC or higher layer signaling, and/or can transmit the number of active spatial relations in a MAC CE or as one or more arrays of configured reference signals and/or as one or more arrays of active spatial relations down-selected from the set of configured reference signals. As described, the UE 104 can obtain the configuration and accordingly detect the one or more active spatial relations based on received RSs.

In method 500, optionally at Block 508, one or more reference signals can be transmitted to the UE based on the configuration. In an aspect, RS configuring component 342, e.g., in conjunction with processor(s) 312, memory 316, transceiver 302, etc., can transmit, based on the configuration, the one or more reference signals to the UE (e.g., UE 104). For example, RS configuring component 342 can transmit the one or more reference signals over resources indicated in the configuration. The UE 104 can accordingly receive the one or more reference signals, and can use the reference signals for determining a beam for transmitting uplink communications to the access point and/or for receiving downlink communications from the access point.

In method 500, optionally at Block 510, downlink communications can be transmitted to the UE using a beam based on one or more of the reference signals indicated in the configuration. In an aspect, RS configuring component 342, e.g., in conjunction with processor(s) 312, memory 316, transceiver 302, etc., can transmit, using the beam based on the one or more of the reference signals indicated in the configuration, downlink communications to the UE (e.g., UE 104). In this example, RS configuring component 342 can generate the beam based on the one or more reference signals transmitted as an active spatial relation to the UE 104 (e.g., based on receiving an indication from the UE 104 of a reference signal having a desirable beam), and can transmit downlink communications using the beam for receiving by the UE 104. In an example, RS configuring component 342 can indicate a TCI state for the beam in DCI, as described.

Figure 6:
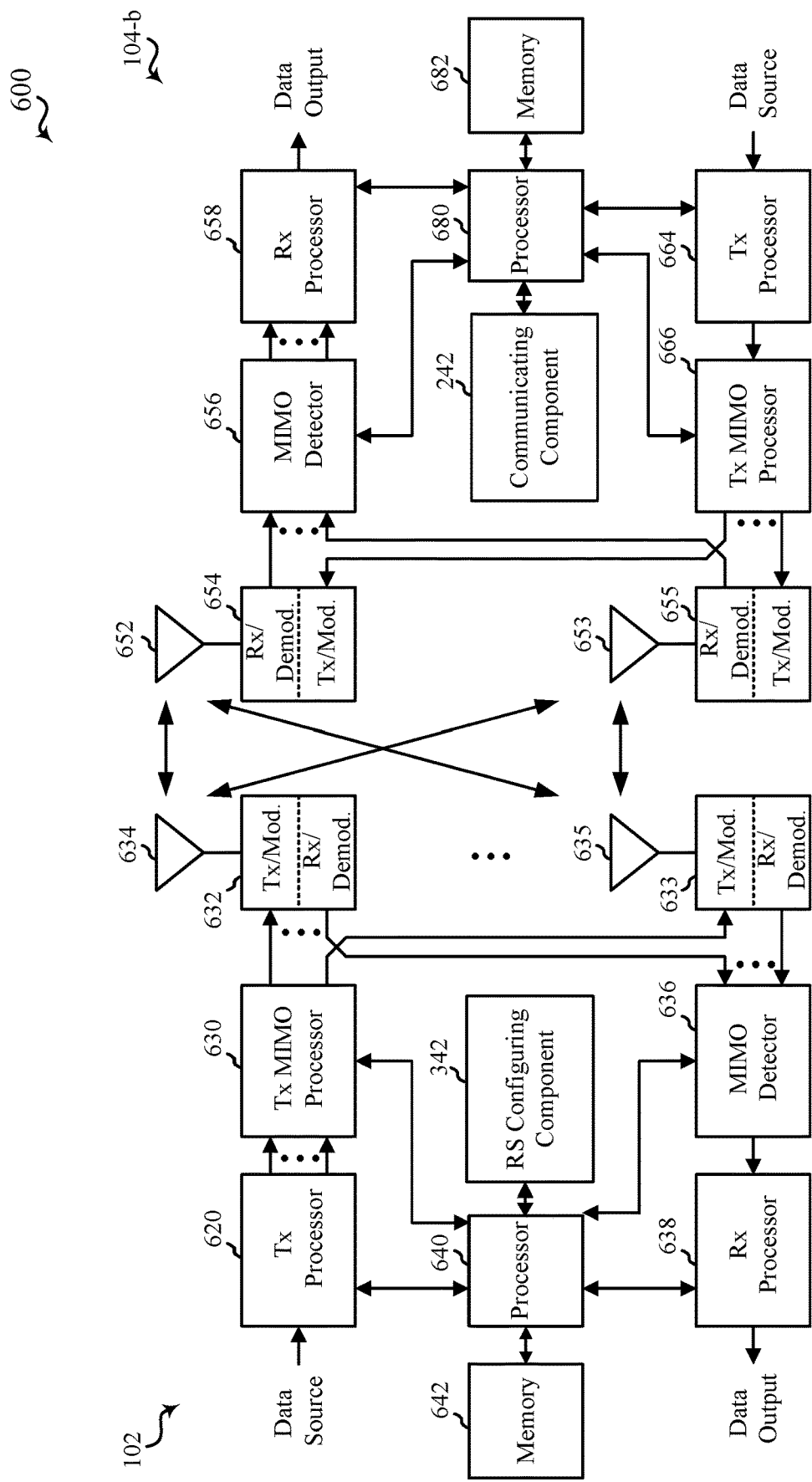
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a RS configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method of wireless communication, comprising:
   indicating, to an access point, a capability indicating a number of active spatial relations supported for detecting downlink reference signals or generating uplink beams;
   receiving, from the access point and based on the capability, one or more configurations of spatial relations indicating a transmit filter of reference signals for use in transmitting uplink communications; and
   detecting, based on the one or more configurations, one or more of the reference signals received from the access point.

2. The method of example 1, wherein the one or more configurations indicate one or more types of reference signals defining the number of active spatial relations.

3. The method of example 2, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

4. The method of any of examples 2 or 3, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

5. The method of example 4, wherein the other reference signals include one or more downlink reference signals that are not aperiodic channel state information reference signals.

6. The method of example 5, wherein the other reference signals also include one or more sounding reference signals that are not configured with the one or more downlink reference signals.

7. The method of any of examples 4 to 6, wherein the one or more distinct TCI states are indicated or down-selected in one or more media access control (MAC) control elements (CEs).

8. The method of example 7, wherein the one or more distinct TCI states are associated with a distinct TCI identifier or a distinct quasi-colocation (QCL) type.

9. The method of any of examples 1 to 8, further comprising transmitting, to the access point, uplink communications using a beam based at least in part on the one or more of the reference signals.

10. A method of wireless communication, comprising:
    receiving, from a user equipment (UE), a capability indicating a number of active spatial relations supported for detecting downlink reference signals or generating uplink beams;
    generating, based on the capability, one or more configurations of spatial relations indicating a transmit filter of reference signals for use in transmitting uplink communications; and
    transmitting the one or more configurations to the UE.

11. The method of example 10, further comprising transmitting, based on the one or more configurations, one or more of the reference signals to the UE.

12. The method of any of examples 10 or 11, wherein generating the one or more configurations comprises generating the one or more configurations to indicate one or more types of reference signals defining the number of active spatial relations.

13. The method of example 12, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

14. The method of any of examples 12 or 13, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

15. The method of example 14, wherein the other reference signals include one or more downlink reference signals that are not aperiodic channel state information reference signals.

16. The method of example 15, wherein the other reference signals also include one or more sounding reference signals that are not configured with the one or more downlink reference signals.

17. The method of any of examples 14 to 16, wherein the one or more distinct TCI states are indicated or down-selected in one or more media access control (MAC) control elements (CEs).

18. The method of example 17, wherein the one or more distinct TCI states are associated with a distinct TCI identifier or a distinct quasi-colocation (QCL) type.

19. An apparatus for wireless communication, comprising:
    a transceiver;
    a memory configured to store instructions; and
    one or more processors communicatively coupled with the transceiver and the memory, wherein the one or more processors are configured to:
       indicate, to an access point, a capability indicating a number of active spatial relations supported for detecting downlink reference signals or generating uplink beams;
       receive, from the access point and based on the capability, one or more configurations of spatial relations indicating a transmit filter of reference signals for use in transmitting uplink communications; and detect, based on the one or more configurations, one or more of the reference signals received from the access point.

20. The apparatus of example 19, wherein the one or more configurations indicate one or more types of reference signals defining the number of active spatial relations.

21. The apparatus of example 20, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

22. The apparatus of any of examples 20 or 21, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

23. The apparatus of example 22, wherein the other reference signals include one or more downlink reference signals that are not aperiodic channel state information reference signals.

24. The apparatus of example 23, wherein the other reference signals also include one or more sounding reference signals that are not configured with the one or more downlink reference signals.

25. The apparatus of any of examples 22 to 24, wherein the one or more distinct TCI states are indicated or down-selected in one or more media access control (MAC) control elements (CEs).

26. The apparatus of example 25, wherein the one or more distinct TCI states are associated with a distinct TCI identifier or a distinct quasi-colocation (QCL) type.

27. The apparatus of any of examples 19 to 26, wherein the one or more processors are further configured to transmit, to the access point, uplink communications using a beam based at least in part on the one or more of the reference signals.

28. An apparatus for wireless communication, comprising:
a transceiver;
a memory configured to store instructions; and
one or more processors communicatively coupled with the transceiver and the memory, wherein the one or more processors are configured to:
receive, from a user equipment (UE), a capability indicating a number of active spatial relations supported for detecting downlink reference signals or generating uplink beams;
generate, based on the capability, one or more configurations of spatial relations indicating a transmit filter of reference signals for use in transmitting uplink communications; and
transmit the one or more configurations to the UE.

29. The apparatus of example 28, wherein the one or more processors are further configured to transmit, based on the one or more configurations, one or more of the reference signals to the UE.

30. The apparatus of any of examples 28 or 29, wherein the one or more processors are configured to generate the one or more configurations to indicate one or more types of reference signals defining the number of active spatial relations.

31. The apparatus of example 30, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

32. The apparatus of any of examples 30 or 31, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

33. The apparatus of example 32, wherein the other reference signals include one or more downlink reference signals that are not aperiodic channel state information reference signals.

34. The apparatus of example 33, wherein the other reference signals also include one or more sounding reference signals that are not configured with the one or more downlink reference signals.

35. The apparatus of any of examples 32 to 34, wherein the one or more distinct TCI states are indicated or down-selected in one or more media access control (MAC) control elements (CEs).

36. The apparatus of example 35, wherein the one or more distinct TCI states are associated with a distinct TCI identifier or a distinct quasi-colocation (QCL) type.

37. An apparatus for wireless communication, comprising:
means for indicating, to an access point, a capability indicating a number of active spatial relations supported for detecting downlink reference signals or generating uplink beams;
means for receiving, from the access point and based on the capability, one or more configurations of spatial relations indicating a transmit filter of reference signals for use in transmitting uplink communications; and
means for detecting, based on the one or more configurations, one or more of the reference signals received from the access point.

38. The apparatus of example 37, wherein the one or more configurations indicate one or more types of reference signals defining the number of active spatial relations.

39. The apparatus of example 38, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

40. The apparatus of any of examples 38 or 39, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

41. The apparatus of example 40, wherein the other reference signals include one or more downlink reference signals that are not aperiodic channel state information reference signals.

42. The apparatus of example 41, wherein the other reference signals also include one or more sounding reference signals that are not configured with the one or more downlink reference signals.

43. The apparatus of any of examples 40 to 42, wherein the one or more distinct TCI states are indicated or down-selected in one or more media access control (MAC) control elements (CEs).

44. The apparatus of example 43, wherein the one or more distinct TCI states are associated with a distinct TCI identifier or a distinct quasi-colocation (QCL) type.

45. The apparatus of any of examples 37 to 44, further comprising means for transmitting, to the access point, uplink communications using a beam based at least in part on the one or more of the reference signals.

46. An apparatus for wireless communication, comprising:

means for receiving, from a user equipment (UE), a capability indicating a number of active spatial relations supported for detecting downlink reference signals or generating uplink beams;

means for generating, based on the capability, one or more configurations of spatial relations indicating a transmit filter of reference signals for use in transmitting uplink communications; and means for transmitting the one or more configurations to the UE.

47. The apparatus of example 46, further comprising means for transmitting, based on the one or more configurations, one or more of the reference signals to the UE.

48. The apparatus of any of examples 46 or 47, wherein the means for generating the one or more configurations generates the one or more configurations to indicate one or more types of reference signals defining the number of active spatial relations.

49. The apparatus of example 48, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

50. The apparatus of any of examples 48 or 49, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

51. The apparatus of example 50, wherein the other reference signals include one or more downlink reference signals that are not aperiodic channel state information reference signals.

52. The apparatus of example 51, wherein the other reference signals also include one or more sounding reference signals that are not configured with the one or more downlink reference signals.

53. The apparatus of any of examples 50 to 52, wherein the one or more distinct TCI states are indicated or down-selected in one or more media access control (MAC) control elements (CEs).

54. The apparatus of example 53, wherein the one or more distinct TCI states are associated with a distinct TCI identifier or a distinct quasi-colocation (QCL) type.

55. A computer-readable medium, comprising code executable by one or more processors for wireless communication, the code comprising code for:

indicating, to an access point, a capability indicating a number of active spatial relations supported for detecting downlink reference signals or generating uplink beams;

receiving, from the access point and based on the capability, one or more configurations of spatial relations indicating a transmit filter of reference signals for use in transmitting uplink communications; and detecting, based on the one or more configurations, one or more of the reference signals received from the access point.

56. The computer-readable medium of example 55, wherein the one or more configurations indicate one or more types of reference signals defining the number of active spatial relations.

57. The computer-readable medium of example 56, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

58. The computer-readable medium of any of examples 56 or 57, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

59. The computer-readable medium of example 58, wherein the other reference signals include one or more downlink reference signals that are not aperiodic channel state information reference signals.

60. The computer-readable medium of example 59, wherein the other reference signals also include one or more sounding reference signals that are not configured with the one or more downlink reference signals.

61. The computer-readable medium of any of examples 58 to 60, wherein the one or more distinct TCI states are indicated or down-selected in one or more media access control (MAC) control elements (CEs).

62. The computer-readable medium of example 61, wherein the one or more distinct TCI states are associated with a distinct TCI identifier or a distinct quasi-colocation (QCL) type.

63. The computer-readable medium of any of examples 55 to 62, further comprising code for transmitting, to the access point, uplink communications using a beam based at least in part on the one or more of the reference signals.

64. A computer-readable medium, comprising code executable by one or more processors for wireless communication, the code comprising code for:

receiving, from a user equipment (UE), a capability indicating a number of active spatial relations supported for detecting downlink reference signals or generating uplink beams;

generating, based on the capability, one or more configurations of spatial relations indicating a transmit filter of reference signals for use in transmitting uplink communications; and transmitting the one or more configurations to the UE.

65. The computer-readable medium of example 64, further comprising code for transmitting, based on the one or more configurations, one or more of the reference signals to the UE.

66. The computer-readable medium of any of examples 64 or 65, wherein the code for generating the one or more configurations generates the one or more configurations to indicate one or more types of reference signals defining the number of active spatial relations.

67. The computer-readable medium of example 66, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

68. The computer-readable medium of any of examples 66 or 67, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

69. The computer-readable medium of example 68, wherein the other reference signals include one or more downlink reference signals that are not aperiodic channel state information reference signals.

70. The computer-readable medium of example 69, wherein the other reference signals also include one or more sounding reference signals that are not configured with the one or more downlink reference signals.

71. The computer-readable medium of any of examples 68 to 70, wherein the one or more distinct TCI states are indicated or down-selected in one or more media access control (MAC) control elements (CEs).

72. The computer-readable medium of example 71, wherein the one or more distinct TCI states are associated with a distinct TCI identifier or a distinct quasi-colocation (QCL) type.

What is claimed is:

1. A method of wireless communication, comprising:
    indicating, to an access point, a capability indicating a number of active spatial relations supported for detecting downlink reference signals or generating uplink beams;
    receiving, from the access point and based on the capability, one or more configurations of spatial relations indicating (i) a transmit filter of reference signals for use in transmitting uplink communications and (ii) one or more types of reference signals defining the number of active spatial relations; and
    detecting, based on the one or more configurations, one or more of the reference signals received from the access point.

2. The method of claim 1, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

3. The method of claim 1, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

4. The method of claim 3, wherein the other reference signals include one or more downlink reference signals that are not aperiodic channel state information reference signals.

5. The method of claim 4, wherein the other reference signals also include one or more sounding reference signals that are not configured with the one or more downlink reference signals.

6. The method of claim 3, wherein the one or more distinct TCI states are indicated or down-selected in one or more media access control (MAC) control elements (CEs).

7. The method of claim 6, wherein the one or more distinct TCI states are associated with a distinct TCI identifier or a distinct quasi-colocation (QCL) type.

8. The method of claim 1, further comprising transmitting, to the access point, uplink communications using a beam based at least in part on the one or more of the reference signals.

9. A method of wireless communication, comprising:
    receiving, from a user equipment (UE), a capability indicating a number of active spatial relations supported for detecting downlink reference signals or generating uplink beams;
    generating, based on the capability, one or more configurations of spatial relations indicating (i) a transmit filter of reference signals for use in transmitting uplink communications and (ii) one or more configurations to indicate one or more types of reference signals defining the number of active spatial relations; and
    transmitting the one or more configurations to the UE.

10. The method of claim 9, further comprising transmitting, based on the one or more configurations, one or more of the reference signals to the UE.

11. The method of claim 9, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

12. The method of claim 9, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

13. The method of claim 12, wherein the other reference signals include one or more downlink reference signals that are not aperiodic channel state information reference signals.

14. The method of claim 13, wherein the other reference signals also include one or more sounding reference signals that are not configured with the one or more downlink reference signals.

15. The method of claim 12, wherein the one or more distinct TCI states are indicated or down-selected in one or more media access control (MAC) control elements (CEs).

16. The method of claim 15, wherein the one or more distinct TCI states are associated with a distinct TCI identifier or a distinct quasi-colocation (QCL) type.

17. An apparatus for wireless communication, comprising:
- a transceiver;
- a memory configured to store instructions; and
- one or more processors communicatively coupled with the transceiver and the memory, wherein the one or more processors are configured to:
  - indicate, to an access point, a capability indicating a number of active spatial relations supported for detecting downlink reference signals or generating uplink beams;
  - receive, from the access point and based on the capability, one or more configurations of spatial relations indicating (i) a transmit filter of reference signals for use in transmitting uplink communications and (ii) one or more configurations indicate one or more types of reference signals defining the number of active spatial relations; and
  - detect, based on the one or more configurations, one or more of the reference signals received from the access point.

18. The apparatus of claim 17, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

19. The apparatus of claim 17, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

20. The apparatus of claim 19, wherein the other reference signals include one or more downlink reference signals that are not aperiodic channel state information reference signals.

21. The apparatus of claim 20, wherein the other reference signals also include one or more sounding reference signals that are not configured with the one or more downlink reference signals.

22. The apparatus of claim 19, wherein the one or more distinct TCI states are indicated or down-selected in one or more media access control (MAC) control elements (CEs).

23. The apparatus of claim 22, wherein the one or more distinct TCI states are associated with a distinct TCI identifier or a distinct quasi-colocation (QCL) type.

24. The apparatus of any of claim 17, wherein the one or more processors are further configured to transmit, to the access point, uplink communications using a beam based at least in part on the one or more of the reference signals.

25. An apparatus for wireless communication, comprising:
- a transceiver;
- a memory configured to store instructions; and
- one or more processors communicatively coupled with the transceiver and the memory, wherein the one or more processors are configured to:
  - receive, from a user equipment (UE), a capability indicating a number of active spatial relations supported for detecting downlink reference signals or generating uplink beams;
  - generate, based on the capability, one or more configurations of spatial relations indicating (i) a transmit filter of reference signals for use in transmitting uplink communications and (ii) one or more types of reference signals defining the number of active spatial relations; and
  - transmit the one or more configurations to the UE.

26. The apparatus of claim 25, wherein the one or more processors are further configured to transmit, based on the one or more configurations, one or more of the reference signals to the UE.

27. The apparatus of claim 26, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

28. The apparatus of claim 26, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

29. The apparatus of claim 28, wherein the other reference signals include one or more downlink reference signals that are not aperiodic channel state information reference signals.

30. The apparatus of claim 29, wherein the other reference signals also include one or more sounding reference signals that are not configured with the one or more downlink reference signals.

31. The apparatus of claim 28, wherein the one or more distinct TCI states are indicated or down-selected in one or more media access control (MAC) control elements (CEs).

32. The apparatus of claim 31, wherein the one or more distinct TCI states are associated with a distinct TCI identifier or a distinct quasi-colocation (QCL) type.

33. An apparatus for wireless communication, comprising:
- means for indicating, to an access point, a capability indicating a number of active spatial relations supported for detecting downlink reference signals or generating uplink beams;
- means for receiving, from the access point and based on the capability, one or more configurations of spatial relations indicating (i) a transmit filter of reference signals for use in transmitting uplink communications and (ii) one or more types of reference signals defining the number of active spatial relations; and
- means for detecting, based on the one or more configurations, one or more of the reference signals received from the access point.

34. The apparatus of claim 33, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

35. The apparatus of claim 33, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

36. The apparatus of claim 35, wherein the other reference signals include one or more downlink reference signals that are not aperiodic channel state information reference signals.

37. The apparatus of claim 36, wherein the other reference signals also include one or more sounding reference signals that are not configured with the one or more downlink reference signals.

38. The apparatus of claim 35, wherein the one or more distinct TCI states are indicated or down-selected in one or more media access control (MAC) control elements (CEs).

39. The apparatus of claim 38, wherein the one or more distinct TCI states are associated with a distinct TCI identifier or a distinct quasi-colocation (QCL) type.

40. The apparatus of claim 33, further comprising means for transmitting, to the access point, uplink communications using a beam based at least in part on the one or more of the reference signals.

41. An apparatus for wireless communication, comprising:
    means for receiving, from a user equipment (UE), a capability indicating a number of active spatial relations supported for detecting downlink reference signals or generating uplink beams;
    means for generating, based on the capability, one or more configurations of spatial relations indicating (i) a transmit filter of reference signals for use in transmitting uplink communications and (ii) one or more types of reference signals defining the number of active spatial relations; and
    means for transmitting the one or more configurations to the UE.

42. The apparatus of claim 41, further comprising means for transmitting, based on the one or more configurations, one or more of the reference signals to the UE.

43. The apparatus of claim 41, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

44. The apparatus of claim 41, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

45. The apparatus of claim 44, wherein the other reference signals include one or more downlink reference signals that are not aperiodic channel state information reference signals.

46. The apparatus of claim 45, wherein the other reference signals also include one or more sounding reference signals that are not configured with the one or more downlink reference signals.

47. The apparatus of claim 44, wherein the one or more distinct TCI states are indicated or down-selected in one or more media access control (MAC) control elements (CEs).

48. The apparatus of claim 47, wherein the one or more distinct TCI states are associated with a distinct TCI identifier or a distinct quasi-colocation (QCL) type.

49. A non-transitory computer-readable medium, comprising code executable by one or more processors for wireless communication, the code comprising code for:
    indicating, to an access point, a capability indicating a number of active spatial relations supported for detecting downlink reference signals or generating uplink beams;
    receiving, from the access point and based on the capability, one or more configurations of spatial relations indicating (i) a transmit filter of reference signals for use in transmitting uplink communications and (ii) one or more types of reference signals defining the number of active spatial relations; and
    detecting, based on the one or more configurations, one or more of the reference signals received from the access point.

50. The computer-readable medium of claim 49, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

51. The computer-readable medium of claim 49, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

52. The computer-readable medium of claim 51, wherein the other reference signals include one or more downlink reference signals that are not aperiodic channel state information reference signals.

53. The computer-readable medium of claim 52, wherein the other reference signals also include one or more sounding reference signals that are not configured with the one or more downlink reference signals.

54. The computer-readable medium of claim 51, wherein the one or more distinct TCI states are indicated or down-selected in one or more media access control (MAC) control elements (CEs).

55. The computer-readable medium of claim 54, wherein the one or more distinct TCI states are associated with a distinct TCI identifier or a distinct quasi-colocation (QCL) type.

56. The computer-readable medium of any of claim 49, further comprising code for transmitting, to the access point, uplink communications using a beam based at least in part on the one or more of the reference signals.

57. A non-transitory computer-readable medium, comprising code executable by one or more processors for wireless communication, the code comprising code for:
    receiving, from a user equipment (UE), a capability indicating a number of active spatial relations supported for detecting downlink reference signals or generating uplink beams;
    generating, based on the capability, one or more configurations of spatial relations indicating (i) a transmit filter of reference signals for use in transmitting uplink communications and (ii) one or more types of reference signals defining the number of active spatial relations; and
    transmitting the one or more configurations to the UE.

58. The computer-readable medium of claim 57, further comprising code for transmitting, based on the one or more configurations, one or more of the reference signals to the UE.

59. The computer-readable medium of claim 57, wherein the one or more types of reference signals include one or more distinct transmission configuration indicator (TCI) states of one or more aperiodic channel state information reference signals, and wherein a count of the one or more distinct TCI states is less than or equal to the number of active spatial relations indicated in the capability.

60. The computer-readable medium of claim 57, wherein the one or more types of reference signals include one or more distinct transmission configuration indicator (TCI) states of one or more aperiodic channel state information reference signals, and wherein a count of the one or more distinct TCI states added to a second count of other reference signals in the one or more configurations is less than or equal to the number of active spatial relations indicated in the capability.

61. The computer-readable medium of claim 60, wherein the other reference signals include one or more downlink reference signals that are not aperiodic channel state information reference signals.

62. The computer-readable medium of claim 61, wherein the other reference signals also include one or more sounding reference signals that are not configured with the one or more downlink reference signals.

63. The computer-readable medium of claim 60, wherein the one or more distinct TCI states are indicated or down-selected in one or more media access control (MAC) control elements (CEs).

64. The computer-readable medium of claim 63, wherein the one or more distinct TCI states are associated with a distinct TCI identifier or a distinct quasi-colocation (QCL) type.

* * * * *